(12) United States Patent
Tang et al.

(10) Patent No.: US 11,188,247 B2
(45) Date of Patent: Nov. 30, 2021

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Haiying Tang, Beijing (CN); Xiaobo Zhang, Beijing (CN); Jian Gao, Beijing (CN); Geng Han, Beijing (CN); Xinlei Xu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 43 days.

(21) Appl. No.: 16/876,712

(22) Filed: May 18, 2020

(65) Prior Publication Data
US 2021/0124520 A1  Apr. 29, 2021

(30) Foreign Application Priority Data
Oct. 28, 2019  (CN) .......................... 201911031607.5

(51) Int. Cl.
*G06F 3/06* (2006.01)
(52) U.S. Cl.
CPC .......... *G06F 3/0649* (2013.01); *G06F 3/067* (2013.01); *G06F 3/0614* (2013.01); *G06F 3/0653* (2013.01); *G06F 3/0659* (2013.01); *G06F 3/0683* (2013.01); *G06F 3/0689* (2013.01)

(58) Field of Classification Search
None
See application file for complete search history.

(56) References Cited

U.S. PATENT DOCUMENTS 10,831,371 B2 * 11/2020 Mueller-Wicke ..... G06F 3/0619
2010/0228886 A1 * 9/2010 Kang .................... G06F 3/0613
710/6

* cited by examiner

*Primary Examiner* — Brian R Peugh
(74) *Attorney, Agent, or Firm* — BainwoodHuang

(57) ABSTRACT

In certain techniques, a plurality of storage devices of a storage system are sorted into a sequence of storage devices by capacity. A first number of at least one storage device with maximum capacity in the sequence of storage devices is determined. A group of storage devices are selected from the sequence of storage devices based on the first number, a device number of storage devices in the sequence and a threshold device number, the number of storage devices in the group of storage devices being less than or equal to the threshold device number. A user storage system is built based on storage space in the group of storage devices, the user storage system having a predetermined width for representing a sum of a data width and a parity width in one stripe of the user storage system. Accordingly, efficiency of storage space utilization can be improved.

20 Claims, 13 Drawing Sheets

METHOD, DEVICE, AND COMPUTER PROGRAM PRODUCT FOR MANAGING STORAGE SYSTEM

CROSS-REFERENCE TO RELATED APPLICATION

This application claims priority to Chinese Patent Application No. CN201911031607.5, on file at the China National Intellectual Property Administration (CNIPA), having a filing date of Oct. 28, 2019, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure relate to the management of storage systems, and more specifically, to a method, device and computer program product for managing access to a storage system.

BACKGROUND

With the development of data storage technology, various data storage devices now provide users with increasingly large data storage capability, and also their data access speed has been greatly increased. With the increase of data storage capability, users also impose higher demands on data reliability and response time of storage systems. So far various data storage systems based on redundant arrays of independent disks (RAID) have been developed to improve data reliability. When one or more disks in a storage system fail(s), data in failed disk(s) can be recovered from other normal disk.

A mapped Redundant Array of Independent Disks (mapped RAID) has been developed so far. In this mapped RAID, a disk is a logical concept and may include a plurality of extents. Extents comprised in one logical disk may be distributed across different physical storage devices in a resource pool. For a plurality of extents in one stripe of the mapped RAID, these extents may be distributed across different physical storage devices, so that when a physical storage device where one extent among the plurality of extents is located fails, a rebuild operation may be performed to recover data from a physical storage device where another extent is located.

A plurality of storage devices in the resource pool may have different capacities. At this point, it has become a difficult technical problem to effectively utilize capacities of the plurality of storage devices to build a user storage system.

SUMMARY

Therefore, it is desirable to develop and implement a technical solution for managing a plurality of storage devices in a storage system more effectively. It is desired that the technical solution be compatible with an existing application system to more effectively manage a storage system by reconstructing configurations of the existing storage system.

According to a first aspect of the present disclosure, a method is provided for managing a storage system, the storage system including a plurality of storage devices. In the method, the plurality of storage devices are sorted into a sequence of storage devices by capacity of the plurality of storage devices. A first number of at least one storage device with maximum capacity in the sequence of storage devices is determined. A group of storage devices are selected from the sequence of storage devices based on the first number, a device number of storage devices in the sequence and a threshold device number, the number of storage devices in the group of storage devices being less than or equal to the threshold device number. A user storage system is built based on storage space in the group of storage devices, the user storage system having a predetermined width for representing a sum of a data width and a parity width in one stripe of the user storage system.

According to a second aspect of the present disclosure, a device is provided for managing a storage system, the storage system including a plurality of storage devices. The device includes: at least one processor; and a memory coupled to the at least one processor, the memory having instructions stored thereon, the instructions, when executed by the at least one processor, causing the device to perform acts. The acts include: sorting the plurality of storage devices into a sequence of storage devices by capacity of the plurality of storage devices; determining a first number of at least one storage device with maximum capacity in the sequence of storage devices; selecting a group of storage devices from the sequence of storage devices based on the first number, a device number of storage devices in the sequence and a threshold device number, the number of storage devices in the group of storage devices being less than or equal to the threshold device number; and building a user storage system based on storage space in the group of storage devices, the user storage system having a predetermined width for representing a sum of a data width and a parity width in one stripe of the user storage system.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

Figure 1A:
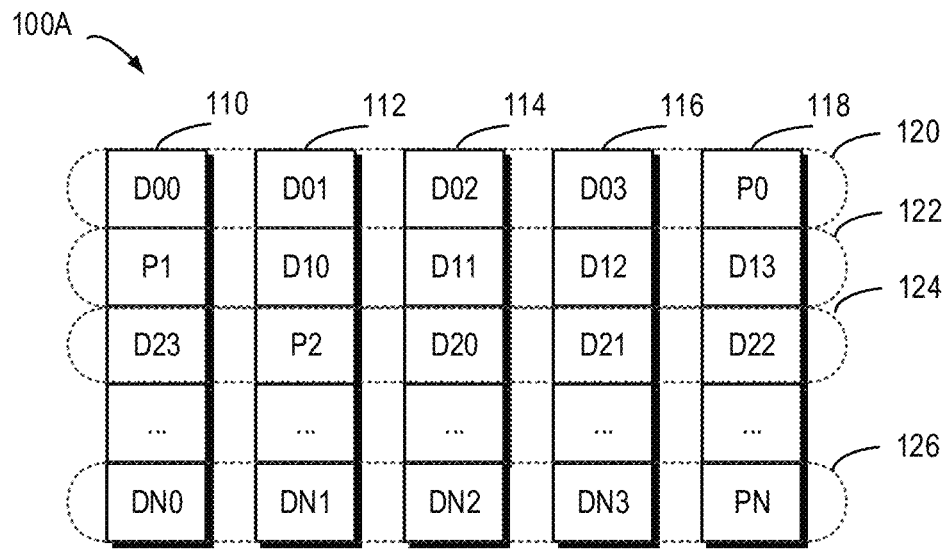
FIGS. 1A and 1B each show a block diagram of a storage system in which implementations of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine a plurality of storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard RAID levels and https://en.wikipedia.org/wiki/Nested RAID levels, etc.

FIG. 1A schematically illustrates a block diagram of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted that although five storage devices are schematically shown in FIG. 1A, in other implementations, more or less storage devices may be comprised according to different levels of RAID. Moreover, although FIG. 1A illustrates stripes 120, 122, 124, ... and 126, in other examples, the RAID system may further include a different number of stripes.

In RAID, a stripe may cross a plurality of physical storage devices (for example, the stripe 120 crosses the storage devices 110, 112, 114, 116 and 118). The stripe may be simply construed as a storage area among a plurality of storage devices which satisfies a given address range. Data stored in the stripe 120 includes a plurality of parts: a data extent D00 stored in the storage device 110, a data extent D01 stored in the storage device 112, a data extent D02 stored in the storage device 114, a data extent D03 stored in the storage device 116, and a data extent P0 stored in the storage device 118. In this example, the data extents D00, D01, D02 and D03 are stored data, and the data extent P0 is a P parity of the stored data.

The mode of storing data in other stripes 122 and 124 is similar to that in the stripe 120, and the difference is that the parity about other data extent may be stored in storage devices other than the storage device 118. In this way, when one of the plurality of storage devices 110, 112, 114, 116 and 118 fails, data in the failed device may be recovered from other normal storage devices.

Figure 1B:
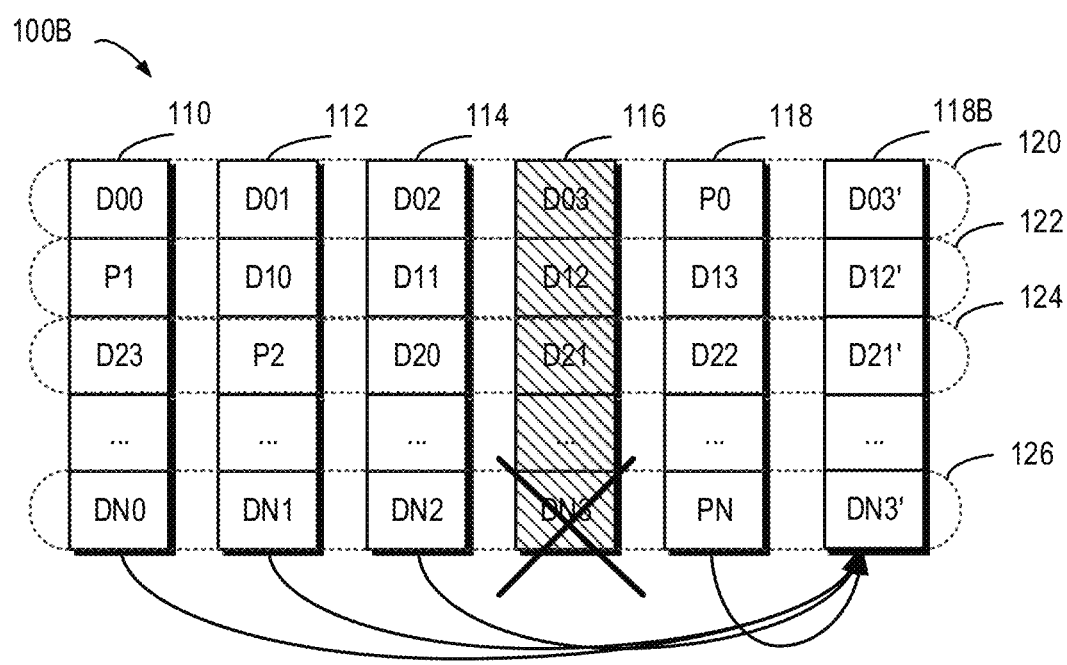

FIG. 1B schematically illustrates a schematic view 100B of a rebuilding process of the storage system 100A. As shown in FIG. 1B, when one storage device (e.g., the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of the definition of RAID-6, for example, two storage devices may be used to store parity P and Q, respectively. For another example, according to definition of triple-parity RAID, three storage devices may be used to store parity P, Q and R, respectively.

Figure 2:
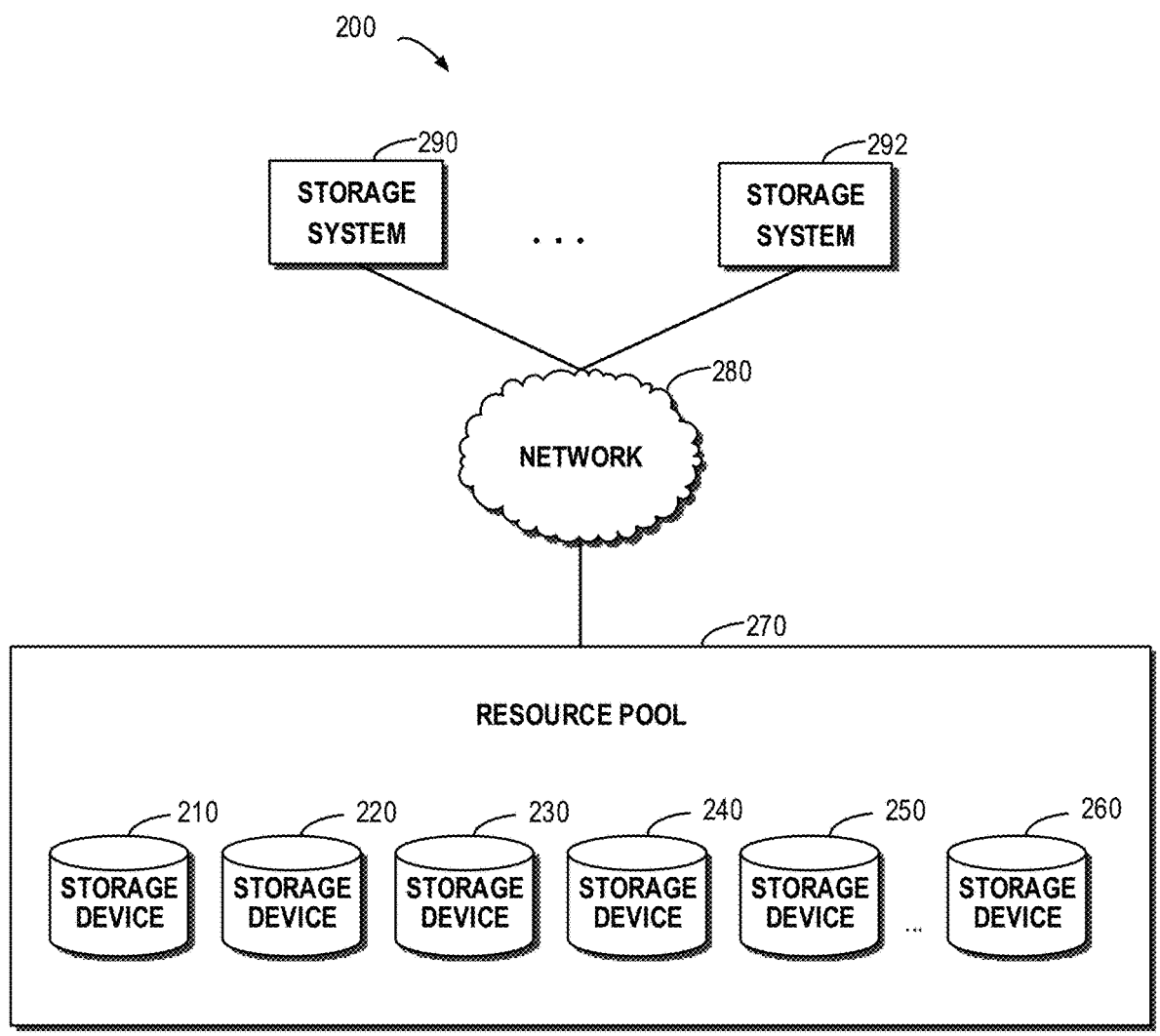
FIG. 2 schematically shows a block diagram of an example environment in which implementations of the present disclosure may be implemented.

With the development of distributed storage technologies, the various storage devices 110, 112, 114, 116 and 118 in the storage system shown in FIGS. 1A and 1B may no longer be limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment 200 in which the method of the present disclosure may be implemented. As depicted, a storage resource pool 270 may include a plurality of physical storage devices 210, 220, 230, 240, 250, . . . , and 260. At this point, storage space in the plurality of storage devices may be allocated to a plurality of storage systems 290, . . . , and 292. At this point, these storage systems 290, . . . , and 292 may access the storage space in the various storage devices in the storage resource pool 270 via a network 280.

Figure 3:
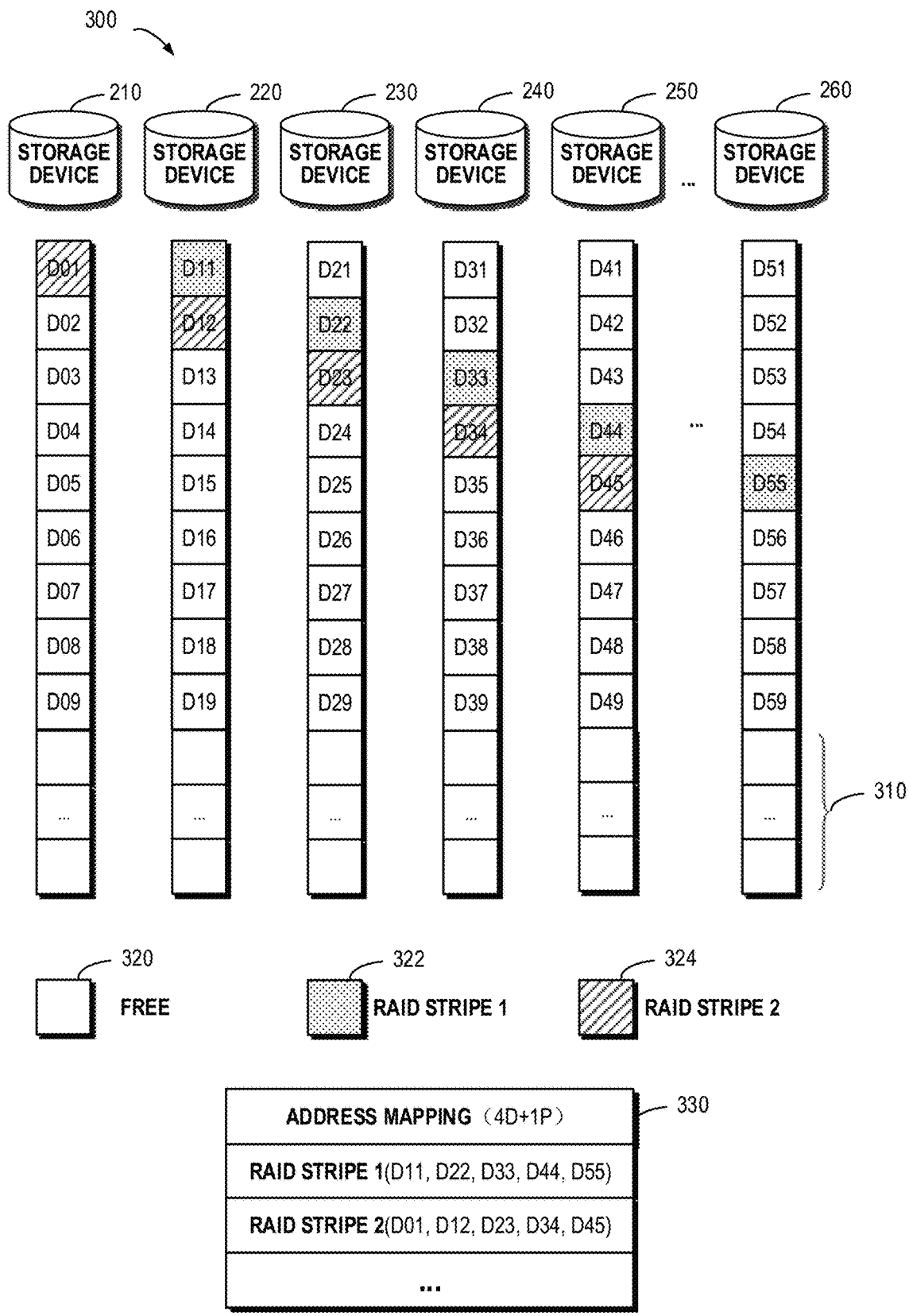
FIG. 3 schematically shows a diagram of a storage resource pool in FIG. 2.

FIG. 3 schematically shows a diagram of more information of the storage resource pool 270 shown in FIG. 2. The resource pool 270 may include a plurality of storage devices 210, 220, 230, 240, 250, . . . , and 260. Each storage device may include a plurality of extents, wherein a legend 320 represents a free extent, a legend 322 represents an extent for RAID stripe 1 of the storage system 110A in FIG. 1, and a legend 324 represents an extent for RAID stripe 2 of the storage system 110A in FIG. 1. At this point, extents D11, D22, D33 and D44 for RAID stripe 1 are used for storing data blocks of the stripe, respectively, and extent D55 is used for storing a parity of data. Extents D01, D12, D23 and D34 for RAID stripe 2 are used for storing data blocks of the stripe, respectively, and extent D45 is used for storing a parity of data.

As shown in FIG. 3, an address mapping 330 shows associations between a stripe and addresses of extents in the stripe. For example, RAID stripe 1 may include 5 extents, namely D11, D22, D33, D44 and D55, which reside on the storage devices 210, 220, 230, 240 and 250, respectively. As shown in FIG. 3, specifically, extent D11 is the first extent in the storage device 220, extent D22 is the second extent in the storage device 230. As shown in FIG. 3, there may exist a reserved spare portion 310 in each storage device, so that when a storage device in the resource pool fails, an extent in the spare portion 310 in each storage device may be selected to rebuild various extents in the failed storage device.

Note in FIG. 3 the 4D+1P RAID-5 storage system is taken as an example to illustrate how extents in various stripes are distributed over a plurality of storage systems in the resource pool. When RAID based on another level is employed, those skilled in the art may implement concrete details on the basis of the above described principles. For example, in the 6D+1P+1Q RAID-6 storage system, 8 extents in each stripe may be distributed over a plurality of storage devices so as to ensure a load balance between the plurality of storage devices.

It will be understood when the number of storage devices in the resource pool increases continuously, if a user storage system is built based on a larger number of storage devices, then the efficiency of managing the user storage system may be reduced. Therefore, the number of storage devices for building a user storage system is subjected to a limitation. In general, less than or equal to 25 storage devices are used to build a RAID-based storage system. When the number of storage devices exceeds the threshold number 25, management operations will become too complex. Therefore, the number of storage devices for building a user storage system is usually determined based on a predetermined width of the user storage system and the threshold number 25. Here the predetermined width represents a sum of a data width and a parity width in one stripe of the user storage system. For example, in a 4D+1P user storage system, the predetermined width is 4+1=5, and then the user storage system may be built by using 5 to 25 storage devices. In other words, the number of storage devices in each group for building the user storage system may be between 5 and 25.

Therefore, when a storage system consists of many storage devices, the plurality of storage devices needs to be grouped, and it should be ensured that the number of storage devices in each group is less than or equal to 25. However, storage devices in the resource pool may have different capacities, and while building the user storage system, it should be ensured that the number of extents in each stripe satisfies the predetermined width of the user storage system. At this point, it has become a difficult technical problem to group a plurality of storage devices to ensure full use is made of storage space in each storage device as much as possible.

Figure 4:
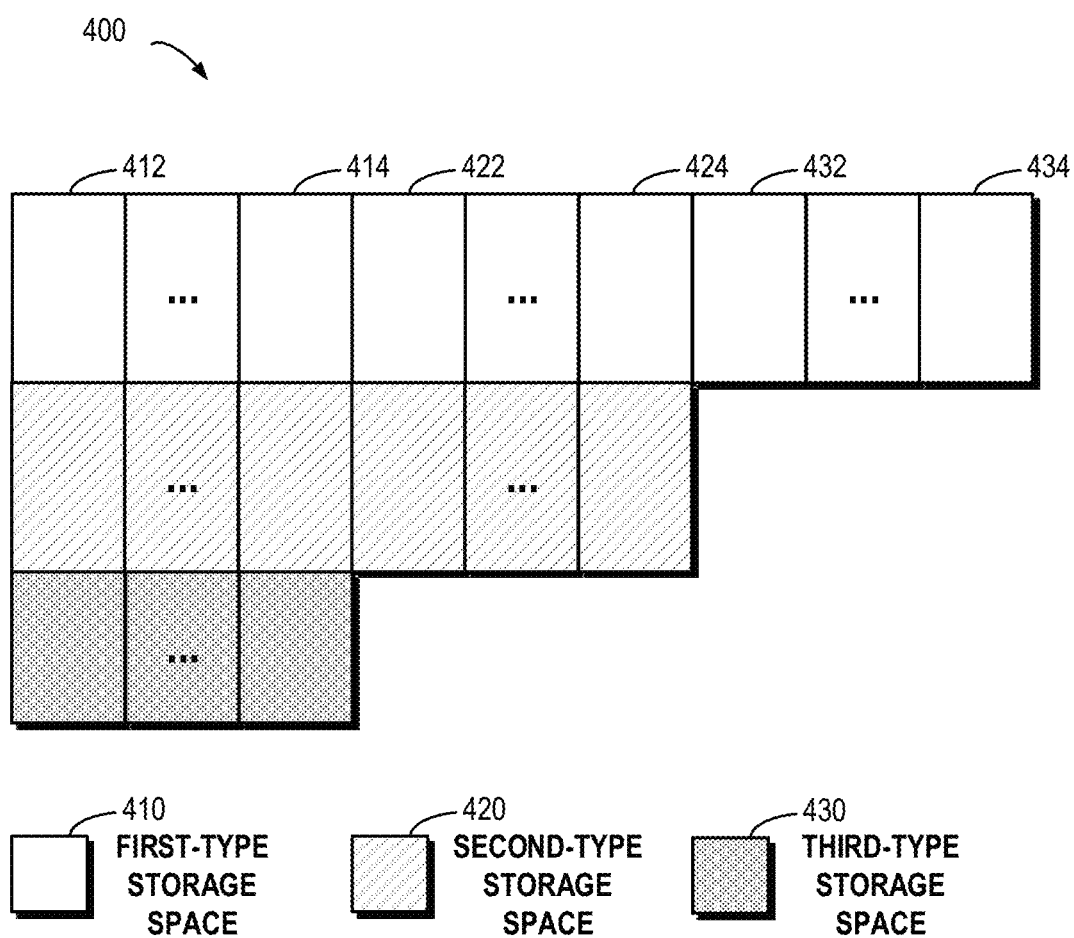
FIG. 4 schematically shows a block diagram of a storage system in which implementations of the present disclosure may be implemented.

FIG. 4 schematically shows a block diagram 400 of a storage system in which implementations of the present disclosure may be implemented. As depicted, the storage system includes storage devices with 3 kinds of capacity. Storage devices 412, . . . , and 414 have larger capacity, storage devices 422, . . . , and 424 have medium capacity, and storage devices 432, . . . , and 434 have smaller capacity. At this point, user storage systems may be built in different ways, and then the resulting storage systems will have different capacities. For the sake of description, suppose the number of storage devices with the larger capacity is larger than or equal to the predetermined width of the user storage system, and the number of the plurality of storage devices is less than or equal to the threshold device number for building a group of storage devices.

For example, if extents are selected from a plurality of storage devices based on the smaller capacity, then as shown in a blank area, first-type storage space 410 may cross all types of storage devices. Although various types of storage devices may be managed easily, some space in the storage devices 422, . . . , and 424 with the medium capacity and the storage devices 412, . . . , and 414 in the larger capacity (e.g., portions shown by legends 420 and 430) will be wasted.

In order to make more effective use of storage space in the plurality of storage devices with different capacities, storage space in the plurality of storage devices may be divided into three types: first-type storage space 410, second-type storage space 420 and third-type storage space 430. At this point, a user storage system may be built using the three types of storage space, respectively. For example, one or more stripes may be built based on the first-type storage space 410, as a portion of the user storage system. At this point, since the number of storage devices with the larger capacity is larger than or equal to the predetermined width, it can be ensured that the number of extents in each stripe in this portion is larger than or equal to the predetermined width. Further, one or more stripes may be built based on the second-type storage space 420, as a portion of the user storage system. At this point, since the number of storage devices involved in the second-type storage space 420 will be larger than the predetermined width, it can be ensured that the built stripes satisfy the width requirement of the user storage system. Similarly, one or more stripes may be built based on the third-type storage device 430, as a portion of the user storage system.

Technical solutions have been proposed to manage a storage system. However, existing technical solutions fail to make sufficient use of space in a plurality of storage devices. In particular, when storage space in a plurality of storage devices in a storage system is insufficient and a new storage device needs to be added, existing technical solutions allow only one storage device to be added. It will be understood various cases may arise during the running of the storage system. For example, when storage space in the storage system is not effectively utilized, the distribution of storage devices for building a user storage system needs to be adjusted. For another example, when there is a severe shortage of storage space in the storage system, perhaps a plurality of storage devices needs to be added at one time. At this point, a problem arises regarding how to manage a plurality of storage devices so as to make sufficient use of storage space.

To solve the above drawbacks, implementations of the present disclosure provide a method, device and computer program product for managing a storage system. Concrete implementations of the present disclosure will be described in detail below. According to one implementation of the present disclosure, a method for managing a storage system is provided. In the method, a plurality of storage devices are sorted based on capacity of the plurality of storage devices, and preferably storage devices with the larger capacity are used to build a user storage system based on the sorting. In this way, storage space in storage devices with the larger capacity may be utilized as far as possible, and further it may be avoided that storage space in one or more storage devices with the larger capacity fail to be sufficiently utilized.

Figure 5:
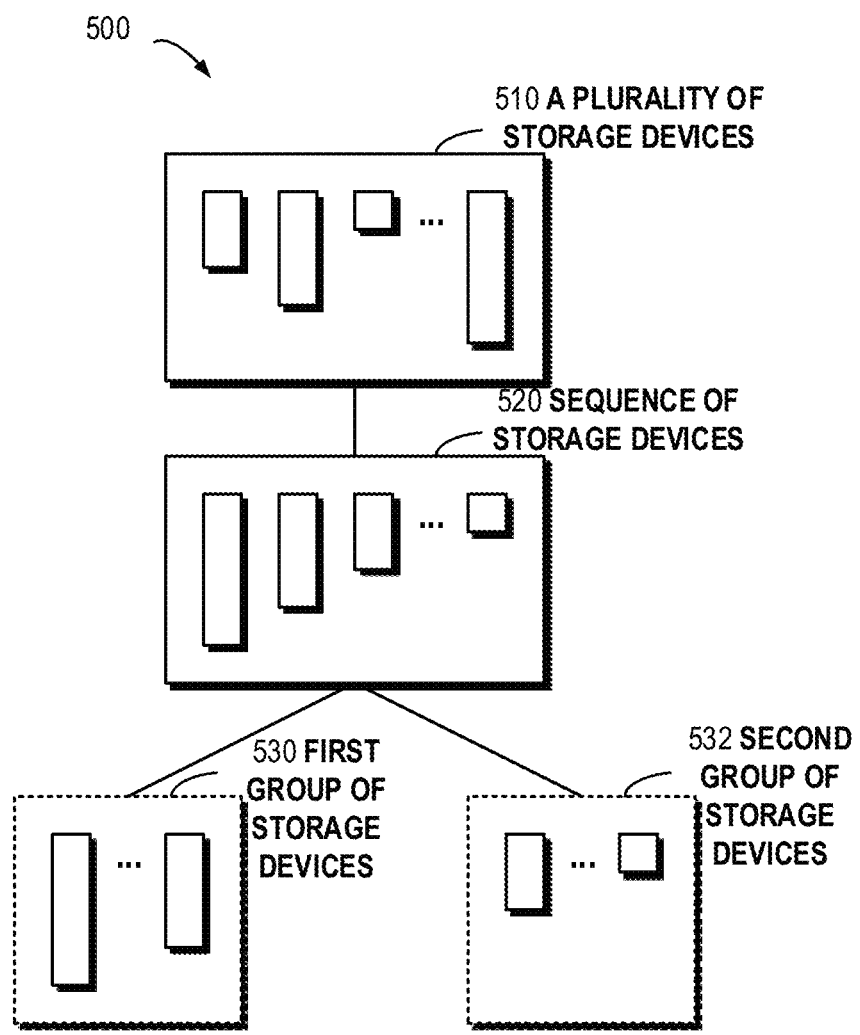
FIG. 5 schematically shows a block diagram of architecture for managing a storage system according to one implementation of the present disclosure.

With reference to FIG. 5 below, a brief description is presented to schematic implementations of the present disclosure. FIG. 5 schematically shows a block diagram 500 for managing a storage system according to one implementation of the present disclosure. As depicted, the storage system may include a plurality of storage devices 510, at which point a predetermined width of a user storage system is known. Here the predetermined width refers to a sum of a data width and a parity width in one stripe of the user storage system. For example, the user storage system may be a 4D+1P storage system, at which point the predetermined width is 4+1=5. For another example, the user storage system may be an 8D+1P storage system, at which point the predetermined width is 8+1=9. For the sake of description, a 4D+1P user storage system is taken as one example below. According to example implementations of the present disclosure, the user storage system may further be based on another RAID level, e.g., including but not limited to, 4D+1P+1Q, 4D+1P+1Q+1R, 8D+1P+1Q, 8D+1P+1Q+1R and other storage system.

As shown in FIG. 5, the plurality of storage devices 510 may be sorted into a sequence 520 of storage devices by capacity. Here the sorting is in a large-to-small order by capacity. Subsequently, according to the order of the sequence, a storage device may be selected from storage devices with the maximum capacity to build the user storage system.

As shown in FIG. 5, storage devices with the larger capacity may be selected as a first group 530 of storage devices, and storage devices with the smaller capacity may be selected as a second group 532 of storage devices. It will be understood here the first group 530 of storage devices and the second group 532 of storage devices may be used to build different user storage systems, respectively. More details about schematic implementations of the present disclosure will be described with reference to FIG. 6 below.

Figure 6:
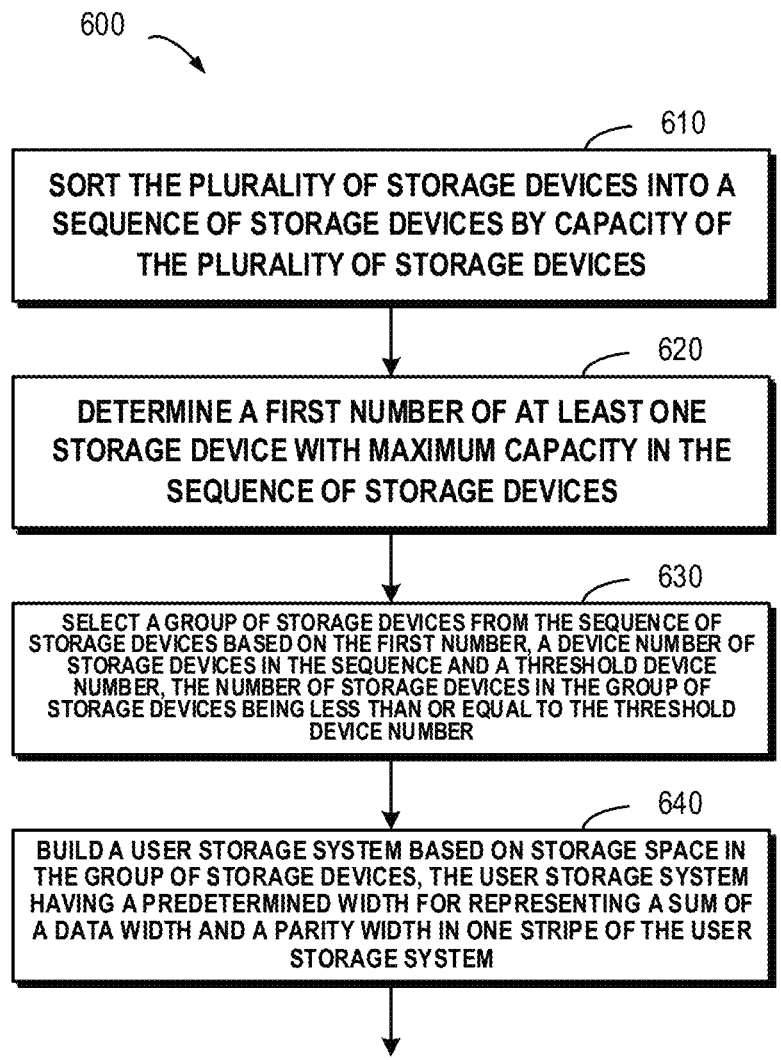
FIG. 6 schematically shows a flowchart of a method for managing a storage system according to one implementation of the present disclosure.

FIG. 6 schematically shows a flowchart of a method 600 for managing a storage system according to one implementation of the present disclosure. It will be understood here the method 600 may be applied when a user storage system is initially built using a plurality of storage devices in a resource pool of a storage system, and also may be applied when there is a shortage of storage space and new storage devices have been added to the storage system.

At block 610, a plurality of storage devices may be sorted into a sequence 520 of storage devices by capacity of the plurality of storage devices. Here, statistics may first be made on the capacity of each storage device, and then the plurality of storage devices may be sorted in a large-to-small order. The sequence may be stored as an array or in another way. For example, the identifier of each storage device may be stored, and the location of the storage device in the sequence may be used to indicate the order of capacity of the plurality of storage devices. Alternatively and/or additionally, capacity of each storage device may further be recorded.

At block 620, a first number of at least one storage device with the maximum capacity in the sequence of storage devices is determined. Returning to FIG. 4, storage devices with the maximum capacity may consist of the storage devices 412, . . . , and 414, and the first number may be determined based on these storage devices. It will be understood only when the first number is larger than or equal to the predetermined width, storage space in storage devices with the maximum capacity can be sufficiently utilized. Therefore, it is the default that the first number may be larger than or equal to the predetermined width.

At block 630, a group of storage devices are selected from the sequence of storage devices based on the first number, a device number of storage devices in the sequence and a threshold device number. It will be understood here the number of storage devices in the group of storage devices is supposed to be less than or equal to the threshold device number. In this way, it may be ensured that the management of the selected group of storage devices will not cause much complexity. Continuing the above example, the number of storage devices in the selected group may be between 5 and 25. Description is presented below with more details on how to select the group of storage devices.

According to example implementations of the present disclosure, the group of storage devices may be selected in two steps. In one step, storage devices with the larger capacity may be selected first. Specifically, a first portion of storage devices may be selected from the at least one storage device with the maximum capacity in the sequence of storage devices. Here the number of the first portion of storage devices may be represented as a first portion number.

According to example implementations of the present disclosure, in the other step, remaining storage devices for building the user storage system may be selected from storage devices in the sequence that have not been selected. Specifically, a second portion of storage devices may be selected from at least one storage device with other capacity in the sequence of storage devices. Here the second portion of storage devices have a second portion number, and the group of storage devices include the first portion of storage devices and the second portion of storage devices.

Figure 7:
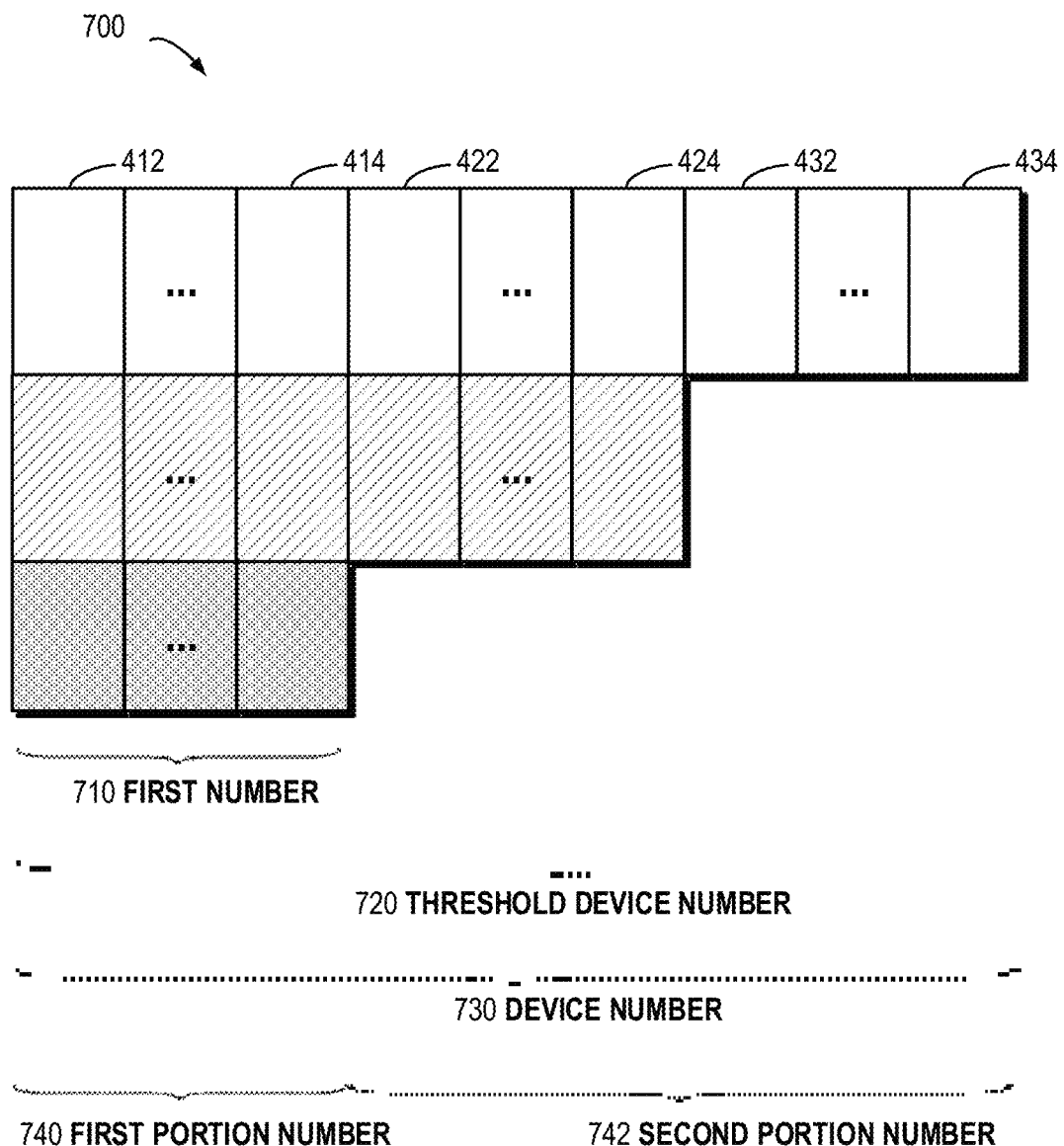
FIG. 7 schematically shows a block diagram for selecting a first portion of storage devices and a second portion of storage devices according to one implementation of the present disclosure.

According to example implementations of the present disclosure, the first portion number may be determined based on the predetermined width, the threshold device number and the first number. It will be understood that the predetermined width, the threshold device number and the first number may have different relationships, and thus different cases need to be identified when determining the first portion number. In one case, if it is determined that the first number is less than or equal to the threshold device number, then the first portion number may be determined based on the first number. With reference to FIG. 7 below, detailed description is presented on how to select the first portion of storage devices and the second portion of storage devices.

FIG. 7 schematically shows a block diagram 700 for selecting the first portion of storage devices and the second portion of storage devices according to one implementation of the present disclosure. FIG. 7 schematically shows a simple case, where a device number 730 of all storage devices in the storage system is less than a threshold device number 720. Therefore, the plurality of storage devices may be assigned to a group of storage devices. At this point, the number of all storage devices with the maximum capacity may be used as a first portion number 740, and further the first portion of storage devices may be selected.

According to example implementations of the present disclosure, when the first portion number has been determined, the first portion of storage devices may be selected from at least one storage device with the larger capacity in the sequence of storage devices based on the first portion number. For example, the storage devices 412, . . . , and 414 may be used as the first portion of storage devices. According to example implementations of the present disclosure, the selected first portion of storage devices may be removed from the sequence of storage devices. In a subsequent operation, the second portion of storage devices may be selected from an updated sequence.

At this point, according to the relationships between the number of storage devices in the sequence and the difference between the threshold device number and the first portion number, there are two cases. In one case, if it is determined that the number of storage devices in the sequence is less than or equal to the difference between the threshold device number and the first portion number, then all storage devices in the sequence of storage devices may be selected as the second portion of storage devices. As shown in FIG. 7, at this point all storage devices may belong to one group of storage devices, and remaining storage devices in the sequence other than the first portion may be used as the second portion of storage devices. At this point, the number of the second portion of storage devices is the second portion number 742. In the other case, if it is determined that the number of storage devices in the sequence of storage devices is larger than the difference between the threshold device number and the first portion number, then a plurality of storage devices in the storage system need to be divided into a plurality of groups (detailed description on how to divide the plurality of storage devices into a plurality of groups will be presented below with reference to FIGS. 8A to 8C).

Returning to FIG. 6, at block 640, the user storage system may be built based on storage space in the group of storage devices. Here the user storage system may be built according to the first-type storage space 410, the second-type storage space 420 and the third-type storage space 430, as shown in the figures.

As shown in FIG. 7, one or more stripes may be built based on the first-type storage space 410, as a portion of the user storage system. At this point, the first portion number 740 is larger than or equal to the predetermined width, so it can be ensured that the number of extents in each stripe in the first portion is larger than or equal to the predetermined width. Further, one or more stripes may be built based on the second-type storage space 420, as a portion of the user storage system. Since the number of storage devices involved in the second-type storage space 420 will be larger than the predetermined width, it can be ensured the built stripes can satisfy the width requirement of the user storage system. Similarly, one or more stripes may be built based on the third-type storage space 430, as a portion of the user storage system.

Figure 8A:
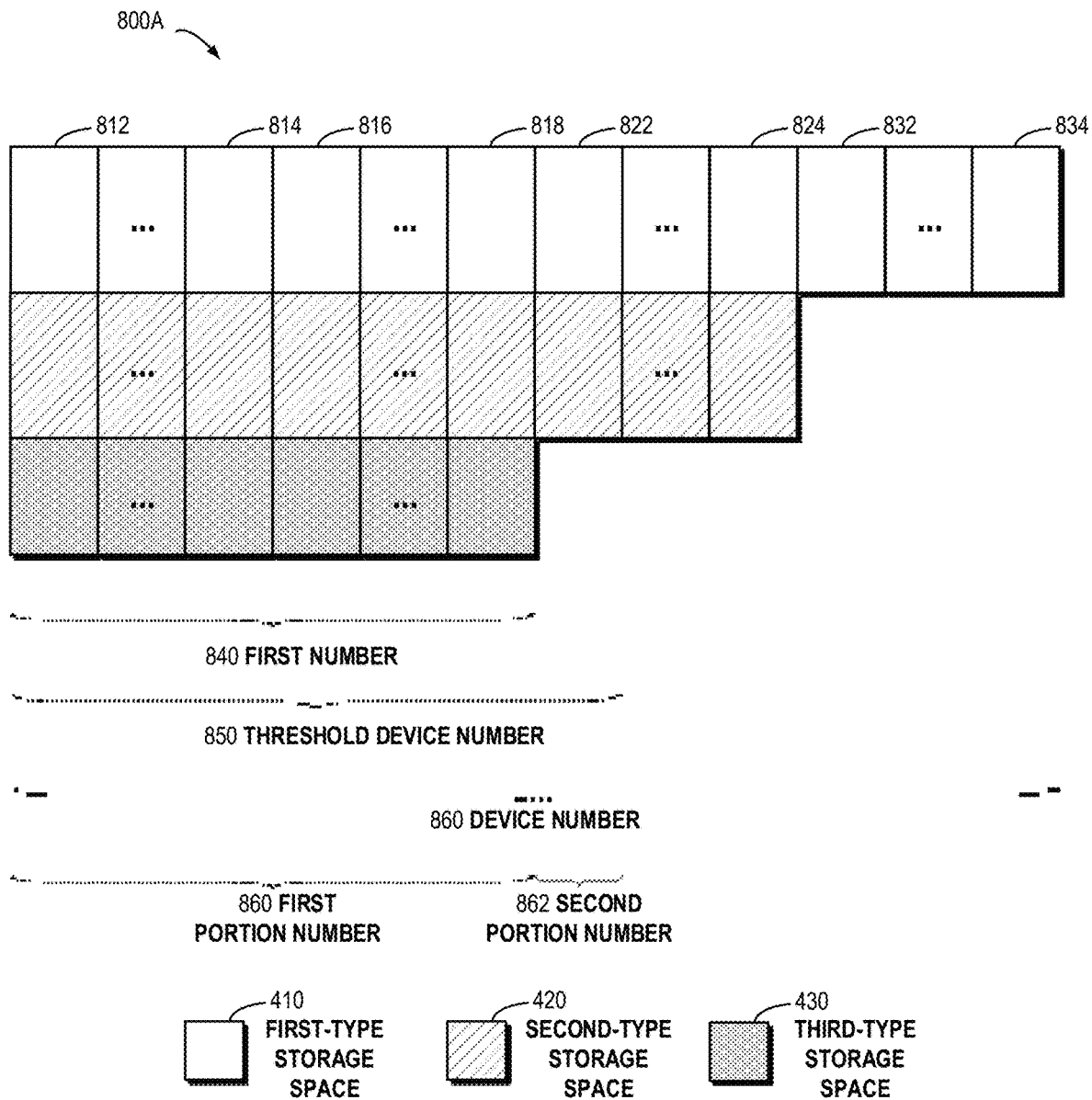
FIG. 8A schematically shows a block diagram for selecting a first portion of storage devices and a second portion of storage devices according to one implementation of the present disclosure.

It will be understood FIG. 7 merely illustrates one simple case. The device number of a plurality of storage devices in the storage system may further be larger than the threshold device number, at which point the plurality of storage devices need to be divided into different groups. Hereinafter, more details about selecting the first portion of storage devices and the second portion of storage devices will be described with reference to FIGS. 8A to 8C. FIG. 8A schematically shows a block diagram 800A for selecting the first portion of storage devices and the second portion of storage devices according to one implementation of the present disclosure. As depicted, the storage system includes a plurality of storage devices, among which storage devices 812, . . . , 814, 816, . . . , 818 have the larger capacity, storage devices 822, . . . , 824 have the medium capacity, and storage devices 832, . . . , 834 have the smaller capacity.

As shown in FIG. 8A, a first number 840 of at least one storage device with the maximum capacity may be less than a threshold device number 850, and a device number 860 of the plurality of storage devices may be larger than the threshold device number. At this point, the number of storage devices with the maximum capacity may be used as a first portion number 860. According to example implementations of the present disclosure, the second portion of storage devices may be selected from at least one storage device with other capacity in the sequence of storage devices. At this point, it should be ensured that the sum of the first portion number and the second portion number is less than or equal to the threshold device number.

According to example implementations of the present disclosure, if it is determined that the number of storage devices in the sequence of storage devices is larger than the difference between the threshold device number and the first portion number, then the second portion of storage devices may be selected so that the difference between the number of storage devices in the sequence and the second portion number is larger than or equal to the predetermined width. As shown in FIG. 8A, the second portion number 862 may be determined based on the difference between the threshold device number 850 and the first portion number 860. Subsequently, the second portion of storage devices may be selected from the storage devices 822, . . . , and 824 with the medium capacity based on the determined second portion number 862.

Figure 8B:
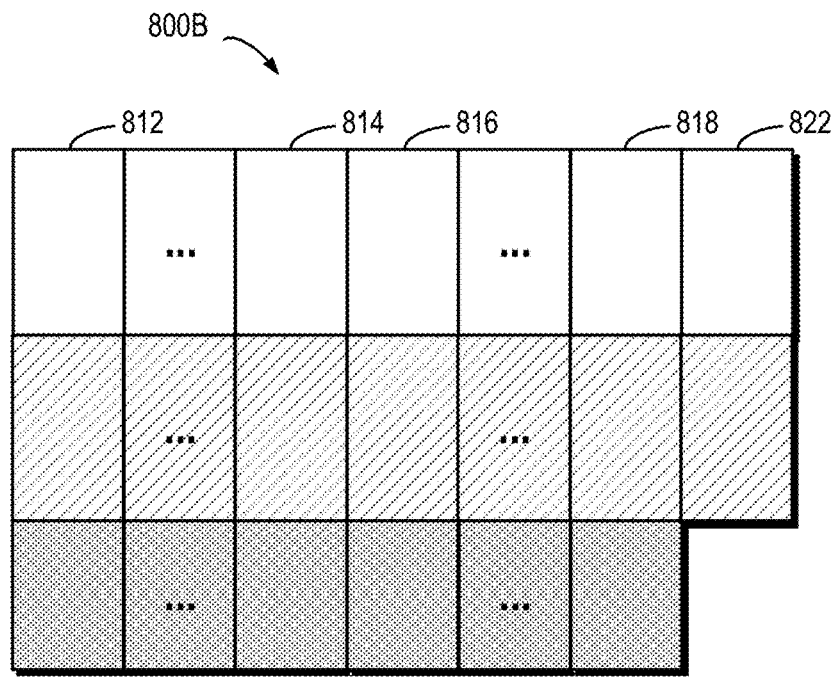
FIG. 8B schematically shows a block diagram for building a user storage system based on the selected first portion and second portion of storage devices according to one implementation of the present disclosure.

FIG. 8B schematically shows a block diagram 800B for building a user storage system based on the selected first portion and second portion of storage devices according to one implementation of the present disclosure. As depicted in FIG. 8B, the first portion of storage devices may include the storage devices 812, . . . , and 814, 816, . . . , and 818 with the larger capacity, and the second portion of storage devices may include the storage device 822 with the medium capacity. Subsequently, the user storage system may be built as shown by the legends 410, 420 and 430, which is not detailed below.

Figure 8C:
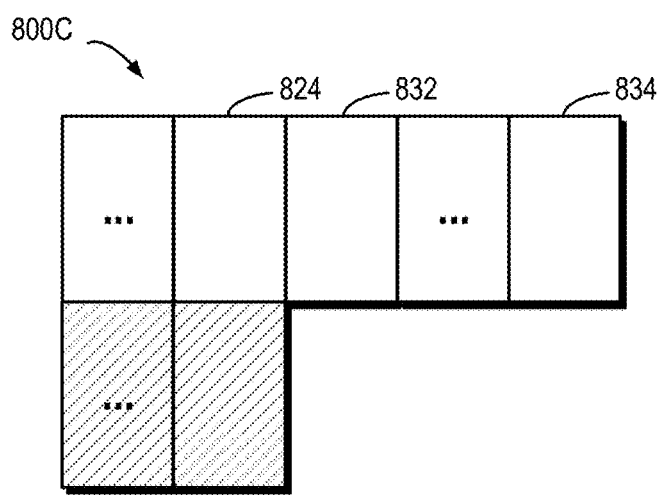
FIG. 8C schematically shows a block diagram of an updated sequence of storage devices according to one implementation of the present disclosure.

According to example implementations of the present disclosure, selected storage devices may be removed from the sequence of storage devices, so as to obtain an updated sequence. Specifically, the first portion and second portion of storage devices are removed from the sequence of storage devices. FIG. 8C schematically shows a block diagram 800C of the updated sequence of storage devices according to one implementation of the present disclosure. As depicted, after the storage devices 812, . . . , and 814, 816, . . . , and 818 and the storage device 822 are removed, the updated sequence of storage devices may include the device 824 with the medium capacity and the storage devices 832, . . . , and 834 with the smaller capacity.

It will be understood that the unselected storage devices in the updated sequence may be processed continually according to the above described method 600. According to example implementations of the present disclosure, a second number of storage devices with the maximum capacity among storage devices in the current sequence may be determined. A further group of storage devices may be selected from the sequence of storage devices based on the second number, the device number of storage devices in the sequence and the threshold device number, and the number of storage devices in the further group of storage devices is less than or equal to the threshold device number. Further, a further user storage system may be built based on storage space in the further group of storage devices.

It will be understood that the above method 600 may be performed on a current sequence of storage devices as shown in FIG. 8C according to the above process. At this point, the "maximum capacity" refers to "maximum capacity" in the sequence that is processed currently. For example, the "maximum capacity" in FIG. 8C is the medium capacity, but not the larger capacity in all storage devices in the storage system.

It will be understood FIGS. 8A to 8C merely illustrate the case in which the number of storage devices with the medium capacity is larger than the difference between the threshold device number 850 and the first portion number 860. If the number of storage devices with the medium capacity is less than the calculated difference, then storage devices may be further selected from other storage devices with the smaller capacity. Alternatively and/or additionally, where the sum of the first portion number 860 and the second portion number 862 does not exceed the threshold device number 850, all storage devices with the medium capacity may be selected as the second portion of storage devices. In this way, it may be ensured there are only a few types of storage devices which have not been selected, and further it may be avoided that stripes can only be built according to the minimum capacity.

Suppose the storage system includes 21 storage devices with larger capacity, 2 with the medium capacity and 5 with the smaller capacity. According to the above method, since the device number of storage devices is 21+2+5=28>25 (threshold device number), the plurality of storage devices need to be divided into 2 groups of storage devices. The first portion of the first group of storage devices may include 21 storage devices with the maximum capacity. If subsequent 25−21=4 storage devices (including 2 storage devices with the medium capacity and 2 storage devices with the smaller capacity) are selected, then storage space in the last 5−2=3 storage devices with the smaller capacity cannot be used. Therefore, all the 2 storage devices with the medium capacity may be selected as the second portion of storage devices, and 5 storage devices with the smaller capacity may be assigned to the second group of storage devices. In this way, storage space in all storage spaces may be used.

According to example implementations of the present disclosure, a second number of the second portion of storage devices may be further set to 0. In this way, storage devices with the same capacity may be selected to build a group of storage devices, and the types of capacity of remaining storage devices which have not been selected may be reduced. Suppose the storage system includes 24 storage devices with larger capacity, 5 with the medium capacity and 5 with the smaller capacity. According to the approach described above, since the device number of storage devices is 24+5+5=35>25 (threshold device number), at this point the plurality of storage devices need to be divided into 2 groups of storage devices. The first portion of the first group of storage devices may include 24 storage devices with the maximum capacity.

At this point, if a storage device with the medium capacity is selected as the last storage device in the first group of storage devices, then 4 storage devices with the medium capacity and 5 with the smaller capacity will remain. In this case, storage space in 4 storage devices with the medium capacity cannot be effectively utilized. At this point, the number of the second portion of storage devices may be set to 0. In this way, all 24 storage devices with the larger capacity may be used as the first group of storage devices, while the subsequent 5 storage devices with the medium capacity and 5 storage devices with the smaller capacity may be used as the second group of storage devices.

According to example implementations of the present disclosure, as many storage devices with the larger capacity as possible may be selected to join the first group of storage devices. In this way, all storage space in storage devices with the larger capacity may be utilized as far as possible, so that larger storage space may be provided to the user storage system.

Description has been presented on how to assign storage devices with the larger capacity to one group of storage devices with reference to FIGS. 7, 8A to 8C. According to example implementations of the present disclosure, storage devices with the larger capacity may further be divided into a plurality of groups of storage devices. More details will be provided below with reference to FIGS. 9A to 9C.

Figure 9A:
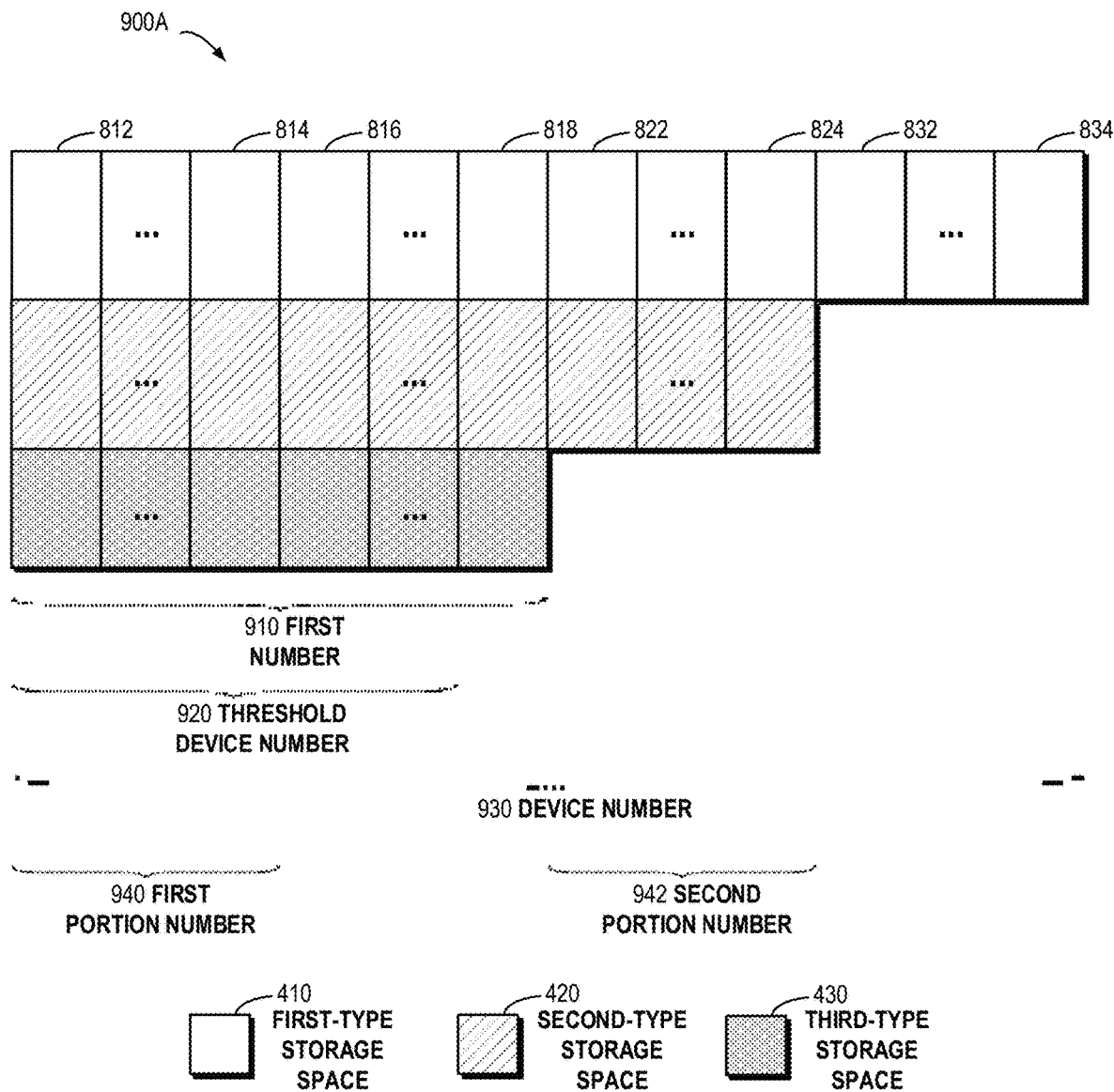
FIG. 9A schematically shows a block diagram for selecting a first portion of storage devices and a second portion of storage devices according to one implementation of the present disclosure.

FIG. 9A schematically shows a block diagram 900A for selecting the first portion of storage devices and the second portion of storage devices according to one implementation of the present disclosure. In the figure, a first number 910 is larger than a threshold device number 920, and a device number 930 is larger than the threshold device number 920. At this point, a portion of storage devices may be selected from storage devices with the larger capacity, as the first portion of storage devices. According to example implementations of the present disclosure, if it is determined that the first number is larger than the threshold device number, one group of storage devices are not sufficient to include all storage devices with the maximum capacity, at which point storage devices with the maximum capacity need to be distributed among different groups of storage devices.

It will be understood the number of storage devices with the maximum capacity in each group needs to satisfy two conditions: 1) being larger than or equal to the predetermined width so as to ensure that the predetermined RAID level will be met; and 2) being less than or equal to the threshold device number so as to ensure that the management process will not cause too much complexity. At this point, a first portion number may be determined such that the determined first portion number is larger than or equal to the predetermined width and less than or equal to the threshold device number.

According to example implementations of the present disclosure, storage devices with the maximum capacity which have not been selected need to be included in a subsequent group of storage devices. In order to make fuller use of storage space in storage devices with the maximum capacity which have not been selected, it should be ensured that the number of storage devices with the maximum capacity which have not been selected is larger than or equal to the predetermined width. In other words, the difference between the first number and the first portion number is supposed to be larger than or equal to the predetermined width.

With example implementations of the present disclosure, on the one hand, it may be ensured that the number of selected storage devices with the maximum capacity satisfies the above two conditions. On the other hand, it may be ensured that the number of storage devices with the maximum capacity which have not been selected satisfies the first of the above two conditions. If one group of storage devices are not sufficient to include remaining storage devices, then the above method may be repeated on remaining storage devices.

Figure 9B:
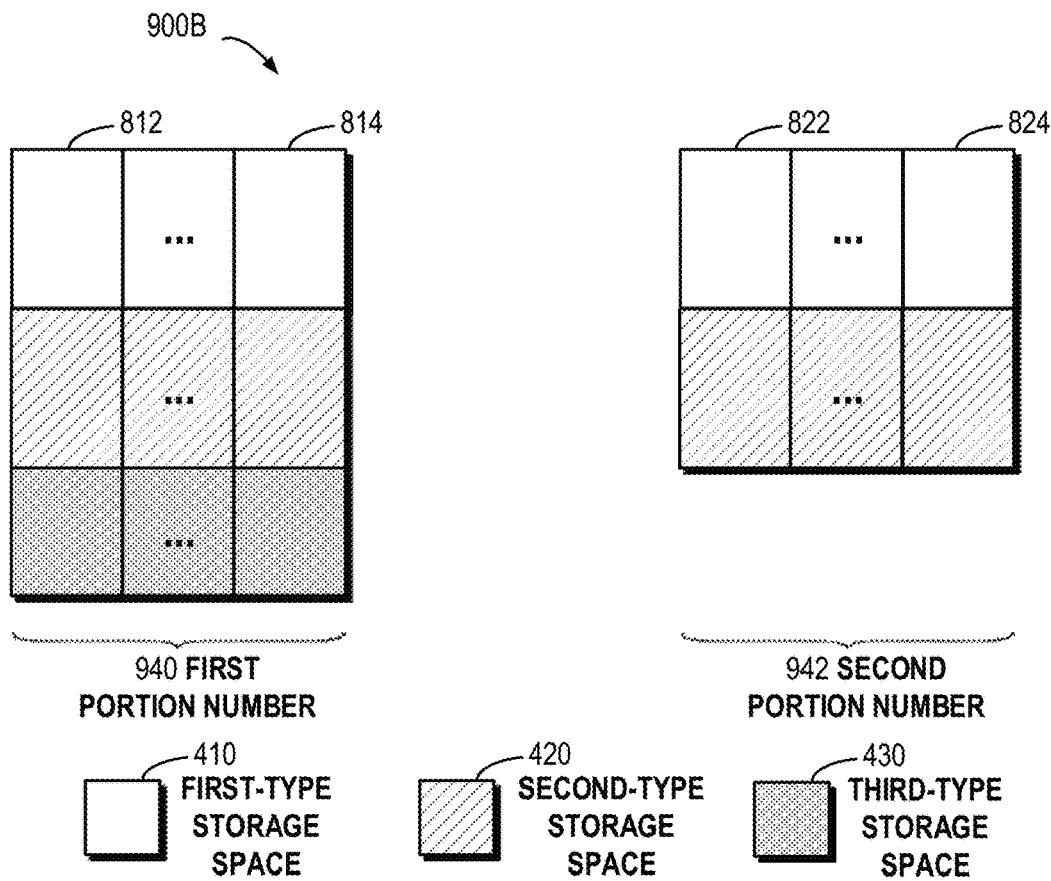
FIG. 9B schematically shows a block diagram for building a user storage system based on the selected first portion and second portion of storage devices according to one implementation of the present disclosure.

FIG. 9B schematically shows a block diagram 900B for building a user storage system based on the selected first portion and second portion of storage devices according to one implementation of the present disclosure. As depicted, the first portion of storage devices may include the storage devices 812, . . . , and 814 with the larger capacity, and the second portion of storage devices may include the storage devices 822, . . . , and 824 with the medium capacity. Subsequently, the user storage system may be built as shown by the legends 410, 420 and 430, which is not detailed below.

Figure 9C:
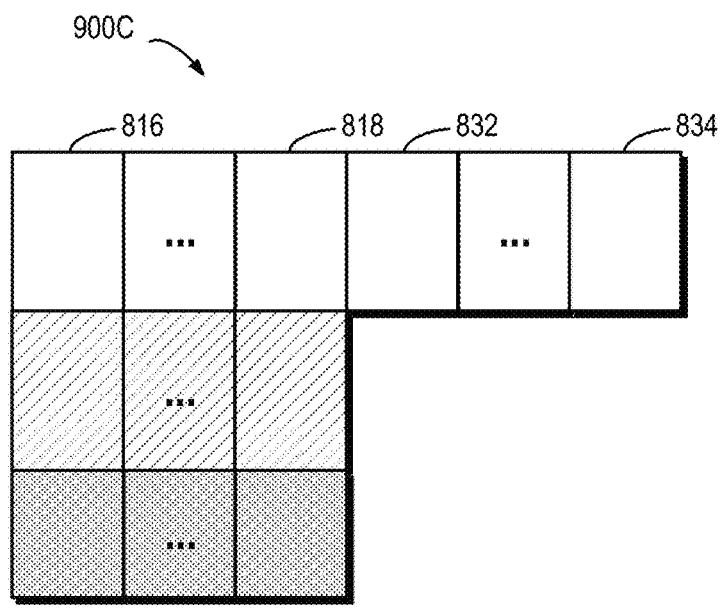
FIG. 9C schematically shows a block diagram of an updated sequence of storage devices according to one implementation of the present disclosure.

Selected storage devices may be removed from the sequence of storage devices so as to obtain an updated sequence. FIG. 9C schematically shows a block diagram 900C of the updated sequence of storage devices according to one implementation of the present disclosure. As depicted, the updated sequence of storage devices includes a sequence of storage devices after the storage devices 812, . . . , and 814 and the storage devices 822, . . . , and 824 have been removed. Subsequently, storage devices in the current updated sequence which have not been selected may be processed according to the above method 600.

According to example implementations of the present disclosure, initially a group of storage devices may be selected from a plurality of storage devices by the above method, and further the user storage system may be provided based on the selected group of storage devices.

According to example implementations of the present disclosure, the method 600 may be performed when expanding the number of storage devices in the storage system. In other words, the method 600 may be performed in accordance with determining the device number is changed. More details about adding storage devices will be described with reference to FIG. 10.

Figure 10A:
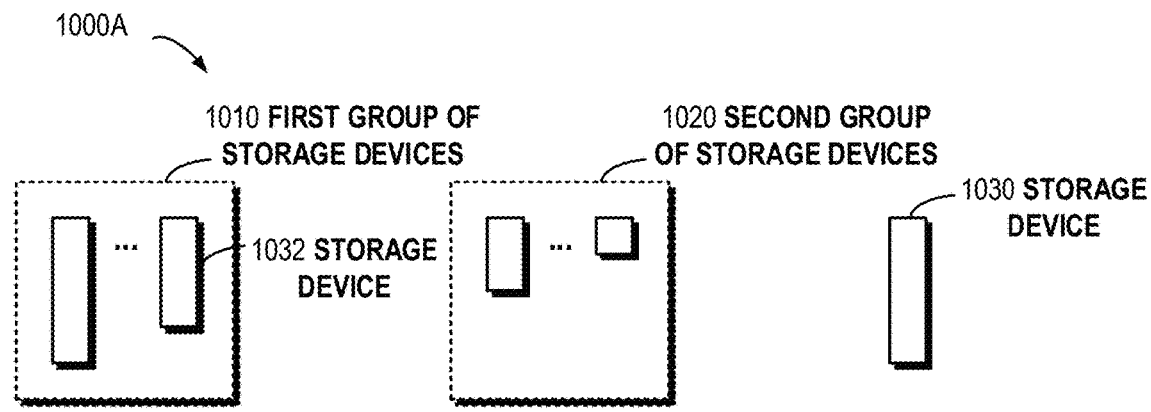
FIG. 10A schematically shows a block diagram for adding a storage device to a storage system according to one implementation of the present disclosure.

FIG. 10A schematically shows a block diagram 1000 for adding a storage device to the storage system according to one implementation of the present disclosure. Suppose the plurality of storage devices in the storage system have been divided into a first group 1010 of storage devices and a second group 1020 of storage devices. A new storage device (e.g., a storage device 1030) may be added to the storage system. At this point, the number of storage devices in the storage system will be changed, so the above method 600 may be performed. The method 600 may change the distribution of the plurality of storage devices among different groups of storage devices. For example, the storage device 1030 may be added to the first group 1010 of storage devices so as to form a first group 1040 of storage devices. For another example, a storage device 1032 that used to be in the first group 1010 of storage devices may be moved to the second group 1020 of storage devices to form a second group 1050 of storage devices.

It will be understood that the method of the present disclosure will change the distribution of storage devices among various groups, in other words, a storage device that used to be in one group of storage devices may be assigned to another group of storage devices. At this point, a migration operation needs to be performed on a storage device whose location has been changed, so as to ensure that data in the same user storage system is in the same group of storage devices. Therefore, regarding a given storage device, it may be determined whether a location of the given storage device is changed before and after the method is performed. If the location is changed, then a data migration operation may be performed.

Figure 10B:
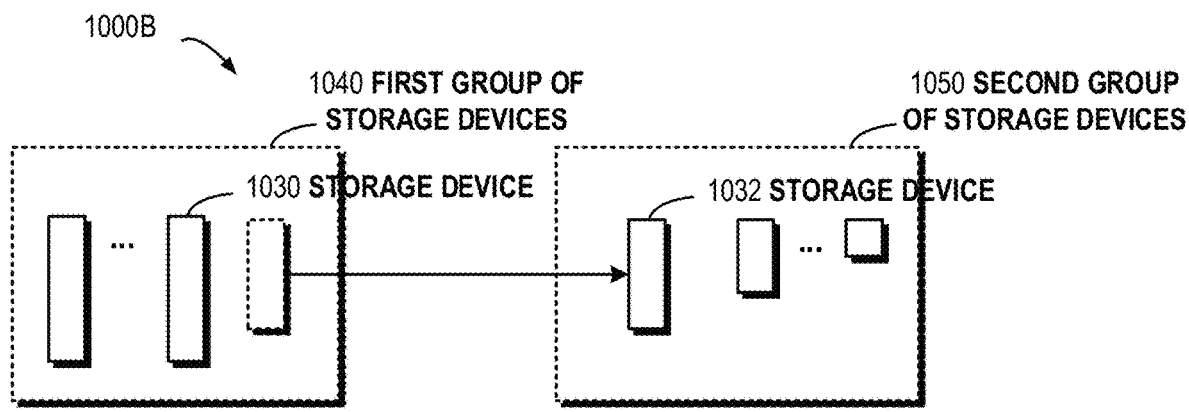
FIG. 10B schematically shows a block diagram of two groups of storage devices obtained based on the storage system as shown in FIG. 10A according to one implementation of the present disclosure.

According to example implementations of the present disclosure, a location of one storage device among the plurality of storage devices may be determined, and the location here represents a group to which the storage device belongs. With reference to FIG. 10B, this figure schematically shows a block diagram 1000B of two groups of storage devices as obtained based on the storage system shown in FIG. 10A according to one implementation of the present disclosure. The storage device 1032 is taken as one example to describe more details about a migration operation. Before the method 600 is performed, the storage device 1032 is in the first group of storage devices, while after the method 600 is performed, the storage device is in the second group of storage devices. At this point, a previous location of the storage device 1032 before the device number is changed and the method 600 is performed may be determined. If two locations are different, then data in the storage device 1032 may be migrated.

It will be understood that although FIGS. 10A and 10B have schematically shown the process for migrating data in one storage device, according to example implementations of the present disclosure, when locations of a plurality of storage devices are all changed, data in the plurality of storage devices may be migrated. According to example implementations of the present disclosure, various migration approaches may be adopted. Further, the amounts of data in storage devices that is to be migrated may be compared, so that a migration approach corresponding to the minimum amount of migrated data may be selected.

It will be understood description on how to group a plurality of storage devices and build a user storage system based on groups has been presented by taking storage devices with three types of capacity as examples. However, according to example implementations of the present disclosure, the plurality of storage devices may further have more or less types of capacity. Those skilled in the art may determine specific groups with reference to the above example implementations.

While examples of the method according to the present disclosure have been described in detail with reference to FIGS. 2 to 10, description is presented below for the implementation of a corresponding apparatus. According to example implementations of the present disclosure, an apparatus is provided for managing a storage system, and the storage system includes a plurality of storage devices. The apparatus includes: a sorting module configured to sort the plurality of storage devices into a sequence of storage devices by capacity of the plurality of storage devices; a determining module configured to determine a first number of at least one storage device with maximum capacity in the sequence of storage devices; a selecting module configured to select a group of storage devices from the sequence of storage devices based on the first number, a device number of storage devices in the sequence and a threshold device number, the number of storage devices in the group of storage devices being less than or equal to the threshold device number; and a building module configured to build a user storage system based on storage space in the group of storage devices, the user storage system having a predetermined width for representing a sum of a data width and a parity width in one stripe of the user storage system.

According to example implementations of the present disclosure, the selecting module includes: a first selecting module configured to select a first portion of storage devices from the at least one storage device with the maximum capacity in the sequence of storage devices, the first portion of storage devices having a first portion number; and a second selecting module configured to select a second portion of storage devices from at least one storage device with other capacity in the sequence of storage devices, the second portion of storage devices having a second portion number, the group of storage devices including the first portion of storage devices and the second portion of storage devices.

According to example implementations of the present disclosure, the first selecting module includes: a first number determining module configured to determine the first portion number based on the predetermined width, the threshold device number and the first number; and a first storage device selecting module configured to select the first portion of storage devices based on the determined first portion number.

According to example implementations of the present disclosure, the first storage device selecting module includes: a first module configured to determine the first portion number based on the first number, in accordance with determining that the first number is less than or equal to the threshold device number; and a second module configured to determine the first portion number in accordance with determining that the first number is larger than the threshold device number, so that the determined first portion number is larger than or equal to the predetermined width and less than or equal to the threshold device number, and the difference between the first number and the first portion number is larger than or equal to the predetermined width.

According to example implementations of the present disclosure, the second selecting module includes: a second storage device selecting module configured to select the second portion of storage devices from at least one storage device with other capacity in the sequence of storage devices, a sum of the first portion number and the second portion number being less than or equal to the threshold device number.

According to example implementations of the present disclosure, the second storage device selecting module includes: a removing module configured to remove the first portion of storage devices from the sequence of storage devices; and a first module configured to select all storage devices in the sequence of storage devices as the second portion of storage devices in accordance with determining that the number of storage devices in the sequence of storage devices is less than or equal to the difference between the threshold device number and the first portion number.

According to example implementations of the present disclosure, the second storage device selecting module further includes: a second module configured to select the second portion of storage devices in accordance with determining that the number of storage devices in the sequence of storage devices is larger than the difference between the threshold device number and the first portion number, so that the difference between the number of storage devices in the sequence and the second portion number is larger than or equal to the predetermined width.

According to example implementations of the present disclosure, the apparatus further includes a removing module configured to remove the first portion of storage devices and the second portion of storage devices from the sequence of storage devices; the determining module is further configured to determine a second number of storage devices with maximum capacity among storage devices in the sequence; the selecting module is further configured to select a further group of storage devices from the sequence of storage devices based on the second number, the device number of storage devices in the sequence and the threshold device number, the number of storage devices in the further group of storage devices being less than or equal to the threshold device number; and the building module is further configured to build a further user storage system based on storage space in the further group of storage devices.

According to example implementations of the present disclosure, the apparatus is started in accordance with determining that the device number is changed.

According to example implementations of the present disclosure, further included are: a location module configured to determine a location of one storage device among the plurality of storage devices, the location presenting a group to which the storage device belongs; and a migrating module configured to migrate data in the storage device in accordance with determining that the location is different from a previous location of the storage device.

Figure 11:
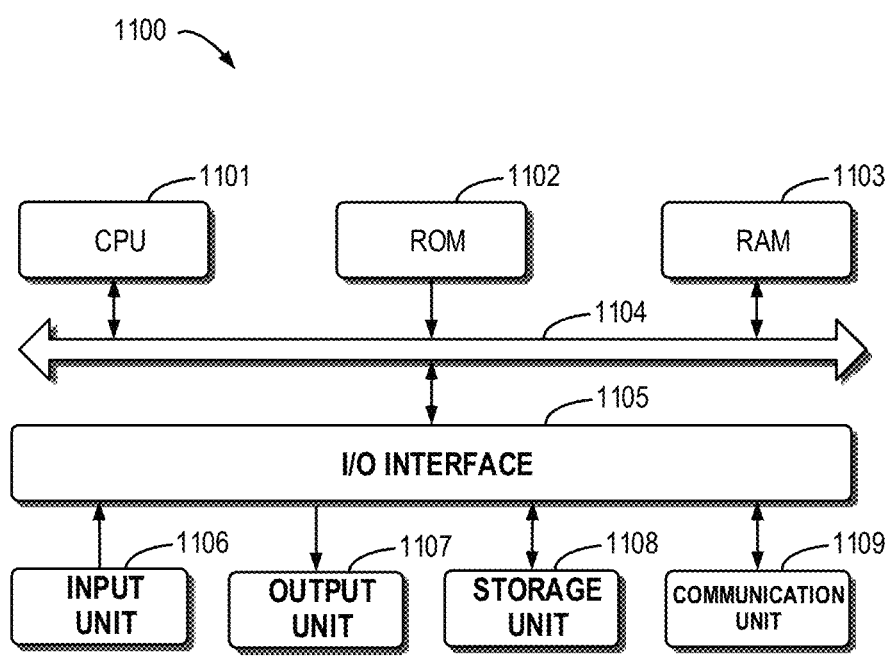
FIG. 11 schematically shows a block diagram of a device for managing a storage system according to example implementations of the present disclosure.

FIG. 11 schematically shows a block diagram of a device 1100 for managing a storage system according to example implementations of the present disclosure. As depicted, the device 1100 includes a central processing unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the device 1100. CPU 1101, ROM 1102 and RAM 1103 are connected to each other via a bus 1104. The input/output (I/O) interface 1105 is also connected to the bus 1104.

A plurality of components in the device 1100 are connected to the I/O interface 1105, including: an input unit 1106, such as a keyboard, mouse and the like; an output unit 1107, e.g., various kinds of displays and loudspeakers etc.; a storage unit 1108, such as a magnetic disk and optical disk, etc.; and a communication unit 1109, such as a network card, modem, wireless transceiver and the like. The communication unit 1109 allows the device 1100 to exchange information/data with other devices via the computer network, such as Internet, and/or various telecommunication networks.

The above described process and treatment, such as the method 600 can also be executed by the processing unit 1101. For example, in some implementations, the method 600 can be implemented as a computer software program tangibly included in the machine-readable medium, e.g., the storage unit 1108. In some implementations, the computer program can be partially or fully loaded and/or mounted to the device 1100 via ROM 1102 and/or the communication unit 1109. When the computer program is loaded to the RAM 1103 and executed by the CPU 1101, one or more steps of the above described method 600 can be implemented. Alternatively, in other implementations, the CPU 1101 also can be configured in other suitable ways to realize the above procedure/method.

According to example implementations of the present disclosure, a device is provided for managing a storage system, the storage system including a plurality of storage devices. The device includes: at least one processor; and a memory coupled to the at least one processor, the memory having instructions stored thereon, the instructions, when executed by the at least one processor, causing the device to perform acts. The acts include: sorting the plurality of storage devices into a sequence of storage devices by capacity of the plurality of storage devices; determining a first number of at least one storage device with maximum capacity in the sequence of storage devices; selecting a group of storage devices from the sequence of storage devices based on the first number, a device number of storage devices in the sequence and a threshold device number, the number of storage devices in the group of storage devices being less than or equal to the threshold device number; and building a user storage system based on storage space in the group of storage devices, the user storage system having a predetermined width for representing a sum of a data width and a parity width in one stripe of the user storage system.

According to example implementations of the present disclosure, selecting the group of storage devices from the sequence of storage devices includes: selecting a first portion of storage devices from the at least one storage device with the maximum capacity in the sequence of storage devices, the first portion of storage devices having a first portion number; and selecting a second portion of storage devices from at least one storage device with other capacity in the sequence of storage devices, the second portion of storage devices having a second portion number, the group of storage devices including the first portion of storage devices and the second portion of storage devices.

According to example implementations of the present disclosure, selecting the first portion of storage devices includes: determining the first portion number based on the predetermined width, the threshold device number and the first number; and selecting the first portion of storage devices based on the determined first portion number.

According to example implementations of the present disclosure, determining the first portion number of the first portion of storage devices includes at least one of: determining the first portion number based on the first number, in accordance with determining that the first number is less than or equal to the threshold device number; and determining the first portion number in accordance with determining that the first number is larger than the threshold device number, so that the determined first portion number is larger than or equal to the predetermined width and less than or equal to the threshold device number, and the difference between the first number and the first portion number is larger than or equal to the predetermined width.

According to example implementations of the present disclosure, selecting the second portion of storage devices includes: selecting the second portion of storage devices from at least one storage device with other capacity in the sequence of storage devices, a sum of the first portion number and the second portion number being less than or equal to the threshold device number.

According to example implementations of the present disclosure, selecting the second portion of storage devices includes: removing the first portion of storage devices from the sequence of storage devices; and selecting all storage devices in the sequence of storage devices as the second portion of storage devices in accordance with determining that the number of storage devices in the sequence of storage devices is less than or equal to the difference between the threshold device number and the first portion number.

According to example implementations of the present disclosure, the acts further include: selecting the second portion of storage devices in accordance with determining that the number of storage devices in the sequence of storage devices is larger than the difference between the threshold device number and the first portion number, so that the difference between the number of storage devices in the sequence and the second portion number is larger than or equal to the predetermined width.

According to example implementations of the present disclosure, the acts further include: removing the first portion of storage devices and the second portion of storage devices from the sequence of storage devices; determining a second number of storage devices with maximum capacity among storage devices in the sequence; selecting a further group of storage devices from the sequence of storage devices based on the second number, the device number of storage devices in the sequence and the threshold device number, the number of storage devices in the further group of storage devices being less than or equal to the threshold device number; and building a further user storage system based on storage space in the further group of storage devices.

According to example implementations of the present disclosure, the acts further include: starting the device in accordance with determining that the device number is changed.

According to example implementations of the present disclosure, the acts further include: determining a location of one storage device among the plurality of storage devices, the location presenting a group to which the storage device belongs; and migrating data in the storage device in accordance with determining that the location is different from a previous location of the storage device.

According to example implementations of the present disclosure, a computer program product is provided. The computer program product is tangibly stored on a non-transitory computer-readable medium and includes machine-executable instructions which are used to implement the method according to the present disclosure.

According to example implementations of the present disclosure, a computer-readable medium is provided. The computer readable medium has machine executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a storage system, the storage system comprising a plurality of storage devices, the method comprising:
   sorting the plurality of storage devices into a sequence of storage devices by capacity of the plurality of storage devices;
   determining a first number of at least one storage device with maximum capacity in the sequence of storage devices;
   selecting a group of storage devices from the sequence of storage devices based on the first number, a device number of storage devices in the sequence and a threshold device number, a number of storage devices in the group of storage devices being less than or equal to the threshold device number; and
   building a user storage system based on storage space in the group of storage devices, the user storage system having a predetermined width for representing a sum of a data width and a parity width in one stripe of the user storage system.

2. The method of claim 1, wherein selecting the group of storage devices from the sequence of storage devices comprises:
   selecting a first portion of storage devices from the at least one storage device with the maximum capacity in the sequence of storage devices, the first portion of storage devices having a first portion number; and
   selecting a second portion of storage devices from at least one storage device with other capacity in the sequence of storage devices, the second portion of storage devices having a second portion number, the group of storage devices comprising the first portion of storage devices and the second portion of storage devices.

3. The method of claim 2, wherein selecting the first portion of storage devices comprises:
   determining the first portion number based on the predetermined width, the threshold device number and the first number; and
   selecting the first portion of storage devices based on the determined first portion number.

4. The method of claim 3, wherein determining the first portion number of the first portion of storage devices comprises at least one of:
   determining the first portion number based on the first number, in accordance with determining that the first number is less than or equal to the threshold device number; and
   determining the first portion number in accordance with determining that the first number is larger than the threshold device number, so that the determined first portion number is larger than or equal to the predetermined width and less than or equal to the threshold device number, and a difference between the first number and the first portion number is larger than or equal to the predetermined width.

5. The method of claim 3, wherein selecting the second portion of storage devices comprises:
   selecting the second portion of storage devices from the at least one storage device with other capacity in the sequence of storage devices, a sum of the first portion number and the second portion number being less than or equal to the threshold device number.

6. The method of claim 5, wherein selecting the second portion of storage devices further comprises:
   removing the first portion of storage devices from the sequence of storage devices; and
   selecting all storage devices in the sequence of storage devices as the second portion of storage devices in accordance with determining that the number of storage devices in the sequence of storage devices is less than or equal to a difference between the threshold device number and the first portion number.

7. The method of claim 6, further comprising:
   selecting the second portion of storage devices in accordance with determining that the number of storage devices in the sequence of storage devices is larger than the difference between the threshold device number and the first portion number, so that a difference between the number of storage devices in the sequence and the second portion number is larger than or equal to the predetermined width.

8. The method of claim 2, further comprising:
   removing the first portion of storage devices and the second portion of storage devices from the sequence of storage devices;
   determining a second number of storage devices with maximum capacity among storage devices in the sequence;
   selecting a further group of storage devices from the sequence of storage devices based on the second number, the device number of storage devices in the sequence and the threshold device number, the number of storage devices in the further group of storage devices being less than or equal to the threshold device number; and
   building a further user storage system based on storage space in the further group of storage devices.

9. The method of claim 1, further comprising: performing the method in accordance with determining that the device number is changed.

10. The method of claim 9, further comprising:
    determining a location of one storage device among the plurality of storage devices, the location presenting a group to which the storage device belongs; and
    migrating data in the storage device in accordance with determining that the location is different from a previous location of the storage device.

11. A device for managing a storage system, the storage system comprising a plurality of storage devices, the device comprising:
    at least one processor; and
    a memory coupled to the at least one processor and having instructions stored thereon, the instructions, when executed by the at least one processor, causing the device to perform acts, comprising:
       sorting the plurality of storage devices into a sequence of storage devices by capacity of the plurality of storage devices;
       determining a first number of at least one storage device with maximum capacity in the sequence of storage devices;
       selecting a group of storage devices from the sequence of storage devices based on the first number, a device number of storage devices in the sequence and a threshold device number, a number of storage devices in the group of storage devices being less than or equal to the threshold device number; and building a user storage system based on storage space in the group of storage devices, the user storage system having a predetermined width for representing a sum of a data width and a parity width in one stripe of the user storage system.

12. The device of claim 11, wherein selecting the group of storage devices from the sequence of storage devices comprises:
selecting a first portion of storage devices from the at least one storage device with the maximum capacity in the sequence of storage devices, the first portion of storage devices having a first portion number; and
selecting a second portion of storage devices from at least one storage device with other capacity in the sequence of storage devices, the second portion of storage devices having a second portion number, the group of storage devices comprising the first portion of storage devices and the second portion of storage devices.

13. The device of claim 12, wherein selecting the first portion of storage devices comprises:
determining the first portion number based on the predetermined width, the threshold device number and the first number; and
selecting the first portion of storage devices based on the determined first portion number.

14. The device of claim 13, wherein determining the first portion number of the first portion of storage devices comprises at least one of:
determining the first portion number based on the first number, in accordance with determining that the first number is less than or equal to the threshold device number; and
determining the first portion number in accordance with determining that the first number is larger than the threshold device number, so that the determined first portion number is larger than or equal to the predetermined width and less than or equal to the threshold device number, and a difference between the first number and the first portion number is larger than or equal to the predetermined width.

15. The device of claim 13, wherein selecting the second portion of storage devices comprises:
selecting the second portion of storage devices from the at least one storage device with other capacity in the sequence of storage devices, a sum of the first portion number and the second portion number being less than or equal to the threshold device number.

16. The device of claim 15, wherein selecting the second portion of storage devices further comprises:
removing the first portion of storage devices from the sequence of storage devices; and
selecting all storage devices in the sequence of storage devices as the second portion of storage devices in accordance with determining that the number of storage devices in the sequence of storage devices is less than or equal to the difference between the threshold device number and the first portion number.

17. The device of claim 16, wherein the acts further comprise:
selecting the second portion of storage devices in accordance with determining that the number of storage devices in the sequence of storage devices is larger than the difference between the threshold device number and the first portion number, so that the difference between the number of storage devices in the sequence and the second portion number is larger than or equal to the predetermined width.

18. The device of claim 12, wherein the acts further comprise:
removing the first portion of storage devices and the second portion of storage devices from the sequence of storage devices;
determining a second number of storage devices with maximum capacity among storage devices in the sequence;
selecting a further group of storage devices from the sequence of storage devices based on the second number, the device number of storage devices in the sequence and the threshold device number, a number of storage devices in the further group of storage devices being less than or equal to the threshold device number; and
building a further user storage system based on storage space in the further group of storage devices.

19. The device of claim 11, wherein the acts further comprise: starting the device in accordance with determining that the device number is changed.

20. A computer program product having a non-transitory computer readable medium which stores a set of instructions to manage a storage system having a plurality of storage devices; the set of instructions, when carried out by computerized circuitry, causing the computerized circuitry to perform a method of:
sorting the plurality of storage devices into a sequence of storage devices by capacity of the plurality of storage devices;
determining a first number of at least one storage device with maximum capacity in the sequence of storage devices;
selecting a group of storage devices from the sequence of storage devices based on the first number, a device number of storage devices in the sequence and a threshold device number, a number of storage devices in the group of storage devices being less than or equal to the threshold device number; and
building a user storage system based on storage space in the group of storage devices, the user storage system having a predetermined width for representing a sum of a data width and a parity width in one stripe of the user storage system.

* * * * *